US010068388B2

(12) United States Patent
Santana Sanchez et al.

(10) Patent No.: US 10,068,388 B2
(45) Date of Patent: Sep. 4, 2018

(54) AUTOMATED SYSTEM FOR SUGGESTING WIPER REPLACEMENT (71) Applicant: FORD GLOBAL TECHNOLOGIES, LLC, Dearborn, MI (US)

(72) Inventors: Tonatiuh Santana Sanchez, Ecatepec de Morelos (MX); Oscar Hernandez Cervantes, Naucalpan de Juarez (MX); Arian Jose Sosa Alfaro, Cuauhtemoc (MX); Antonio Espiritu Santo Rincon, Atizapan de Zaragoza (MX)

(73) Assignee: Ford Global Technologies LLC, Dearborn, MI (US)

( * ) Notice: Subject to any disclaimer, the term of this patent is extended or adjusted under 35 U.S.C. 154(b) by 197 days.

(21) Appl. No.: 15/348,332

(22) Filed: Nov. 10, 2016

(65) Prior Publication Data

US 2018/0130266 A1 May 10, 2018

(51) Int. Cl.
*G07C 5/00* (2006.01)
*B60S 1/38* (2006.01)
(Continued)

(52) U.S. Cl.
CPC .............. *G07C 5/006* (2013.01); *B60S 1/38* (2013.01); *G01M 17/00* (2013.01); *G01M 99/00* (2013.01);
(Continued)

(58) Field of Classification Search
CPC ........ B60S 1/3801; B60S 1/3817; B60S 1/08; B60S 1/0844; B60S 1/38; G07C 5/00; G07C 5/08; G07C 5/02
(Continued)

(56) References Cited

U.S. PATENT DOCUMENTS 4,620,141 A * 10/1986 McCumber ........... B60S 1/0822
15/DIG. 15
5,119,002 A * 6/1992 Kato ..................... B60S 1/0818
318/444
(Continued)

FOREIGN PATENT DOCUMENTS

DE 3935807 A1 5/1991
DE 19955874 A1 5/2001
(Continued)

OTHER PUBLICATIONS

Non-Final Office Action dated Feb. 7, 2018 for Utility U.S. Appl. No. 15/348,235, filed Nov. 10, 2016.

*Primary Examiner* — Courtney D Heinle
*Assistant Examiner* — Luis A Martinez Borrero
(74) *Attorney, Agent, or Firm* — Jason Rogers; King & Schickli PLLC (57) ABSTRACT

A system for determining a need for a vehicle windshield wiper blade replacement includes a detector for detecting a wiper blade operating noise and a processor configured to determine a wear condition requiring wiper blade replacement from the detected wiper blade operating noise. On determining the wear condition, the processor provides a display including at least a windshield wiper blade wear condition warning and a listing of one or more suggested replacement wiper blades. The visible display may further include a listing of one or more suggestions of locations for acquiring the replacement wiper blades. Related methods are also disclosed.

20 Claims, 6 Drawing Sheets (51) Int. Cl.
*G01M 17/00* (2006.01)
*G01M 99/00* (2011.01)
*G07C 5/08* (2006.01)

(52) U.S. Cl.
CPC ..... *G07C 5/0808* (2013.01); *B60S 2001/3844* (2013.01)

(58) Field of Classification Search
USPC .......................... 701/1, 29.1, 30.1, 31.9, 29.6
See application file for complete search history.

(56) References Cited

U.S. PATENT DOCUMENTS

| | | | |
|---|---|---|---|
| 5,254,916 A | 10/1993 | Hopkins | |
| 5,349,718 A * | 9/1994 | Gibbon | B60S 1/38 116/200 |
| 5,642,026 A | 6/1997 | McCann et al. | |
| 6,057,660 A * | 5/2000 | Meier | B60S 1/0818 15/250.12 |
| 6,775,877 B1 * | 8/2004 | Broszniowski | B60S 1/3801 116/200 |
| 7,194,781 B1 | 3/2007 | Orjela | |
| 8,285,437 B2 | 10/2012 | Kubota et al. | |
| 8,598,828 B2 * | 12/2013 | Sabi | B60S 1/08 318/444 |
| 8,843,270 B2 * | 9/2014 | Kwon | B60S 1/0807 15/250.12 |
| 8,890,074 B2 * | 11/2014 | Kim | B60S 1/0833 250/341.8 |
| 9,365,188 B1 | 6/2016 | Penilla et al. | |
| 9,539,984 B2 * | 1/2017 | Dias | B60S 1/0818 |
| 9,827,951 B2 * | 11/2017 | Toda | B60S 1/0807 |
| 2010/0204987 A1 | 8/2010 | Miyauchi | |
| 2013/0105694 A1 * | 5/2013 | Kim | B60S 1/0833 250/341.8 |
| 2013/0145839 A1 * | 6/2013 | Niemann | G01W 1/14 73/170.17 |
| 2013/0185078 A1 | 7/2013 | Tzirkel-Hancock et al. | |
| 2014/0088886 A1 * | 3/2014 | Dias | B60S 1/0818 702/34 |
| 2015/0048771 A1 | 2/2015 | d'Essuyage | |
| 2016/0207500 A1 * | 7/2016 | Renke | B60S 1/38 |
| 2016/0250997 A1 | 9/2016 | Toda | |
| 2017/0139669 A1 * | 5/2017 | Oh | G06F 3/165 |
| 2017/0154481 A1 * | 6/2017 | Chen | G07C 5/0841 |
| 2018/0126955 A1 * | 5/2018 | Green | B60S 1/0822 |

FOREIGN PATENT DOCUMENTS

| | | |
|---|---|---|
| DE | 10254684 A1 | 6/2004 |
| DE | 102009048687 A1 | 4/2011 |
| EP | 2730470 A1 | 5/2014 |
| JP | 200507902 A | 6/2000 |
| JP | 2010052470 A | 3/2010 |
| KR | 19970040176 A | 7/1997 |
| WO | 9614225 A1 | 5/1996 |
| WO | 20010381474 A1 | 5/2001 |

* cited by examiner

AUTOMATED SYSTEM FOR SUGGESTING WIPER REPLACEMENT

TECHNICAL FIELD

This document relates generally to the motor vehicle field and, more particularly, to a system for detecting windshield wiper deterioration and related methods.

BACKGROUND

Windshield wiper blades age and wear over a lifetime that may vary according to wiper use, weather conditions, etc. Moreover, wiper blades may deteriorate or wear sufficiently to require replacement before it becomes obvious that replacement is needed. That is, a vehicle operator may not be aware that wiper blades have deteriorated sufficiently to require replacement until visible and/or audible evidence of such occurs, i.e. smearing, streaking or squeaking or "chatter" occur. At that point, the wiper blades have deteriorated sufficiently to be potentially dangerous, and the vehicle operator may not be able to immediately replace them, further exacerbating the dangerous condition.

Accordingly, a need is identified in the art for a way for a vehicle operator to ascertain that wiper blades require replacement before such advanced deterioration occurs.

SUMMARY

In accordance with the purposes and benefits described herein, in one aspect a system for determining a need for a vehicle windshield wiper blade replacement is provided, comprising a detector for detecting a wiper blade operating noise, a processor configured to determine a wear condition requiring wiper blade replacement from the detected wiper blade operating noise, and a user interface wherein the processor provides a display comprising at least a windshield wiper blade wear condition warning and a listing of one or more suggested replacement wiper blades. In embodiments, the visible display may further include a listing of one or more suggestions of locations for acquiring the replacement wiper blades. The detector may be at least one microphone associated with a passenger cabin of the vehicle.

In embodiments, the processor processes the wiper blade operating noise signal taking into account a rotational speed of the windshield wiper. The processor may determine the wear condition requiring wiper blade replacement by filtering an audio signal received from the detector. The audio signal filtering may be adapted to distinguish an audio signal emitted by a worn wiper blade from an audio signal emitted by a new wiper blade and from a background audio signal.

In embodiments, the system further includes a memory for storing a record of the detected wiper blade operating noise indicative of the wear condition requiring wiper blade replacement. The processor may determine that the wiper blade requires replacement when a predetermined number of records are stored within a predetermined time period.

In accordance with a further aspect of the disclosure, there is provided a method for determining a need for a vehicle windshield wiper blade replacement, comprising, by a detector, detecting a wiper blade operating noise and emitting a signal to a processor. The detector may be a microphone associated with a passenger cabin of the vehicle. Next, the processor determines a wear condition requiring wiper blade replacement from the emitted signal. If such a wear condition is detected, the processor provides a display to a user interface.

In embodiments, the display comprises at least a windshield wiper blade wear condition warning and a listing of one or more suggested replacement wiper blades. The display may further comprise a listing of one or more suggestions of locations for acquiring the replacement wiper blades.

The method includes a step of, by the processor, determining the wear condition requiring wiper blade replacement by filtering an audio signal received from the detector. In embodiments, the filtering step includes filtering the audio signal to distinguish a worn wiper blade audio signal from a new wiper blade audio signal and from a vehicle background audio signal. The processor may process the wiper blade operating noise signal taking into account a rotational speed of the windshield wiper.

The method further includes storing in memory a record of the detected wiper blade operating noise indicative of the wear condition requiring wiper blade replacement. In embodiments, the method may include a step of, by the processor, determining that the wiper blade requires replacement when a predetermined number of records are stored in the memory within a predetermined time period.

In the following description, there are shown and described several preferred embodiments of a system for determining a need for windshield wiper blade replacement and related methods. As it should be realized, the arrangement is capable of other, different embodiments and its several details are capable of modification in various, obvious aspects all without departing from the system for determining a need for windshield wiper blade replacement and related methods, as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the system for determining a need for windshield wiper blade replacement and related methods and, together with the description, serve to explain certain principles thereof. In the drawing figures.

Reference will now be made in detail to the present preferred embodiments of a system for determining a need for windshield wiper blade replacement and related methods, examples of which are illustrated in the accompanying drawing figures.

DETAILED DESCRIPTION

Figure 1:
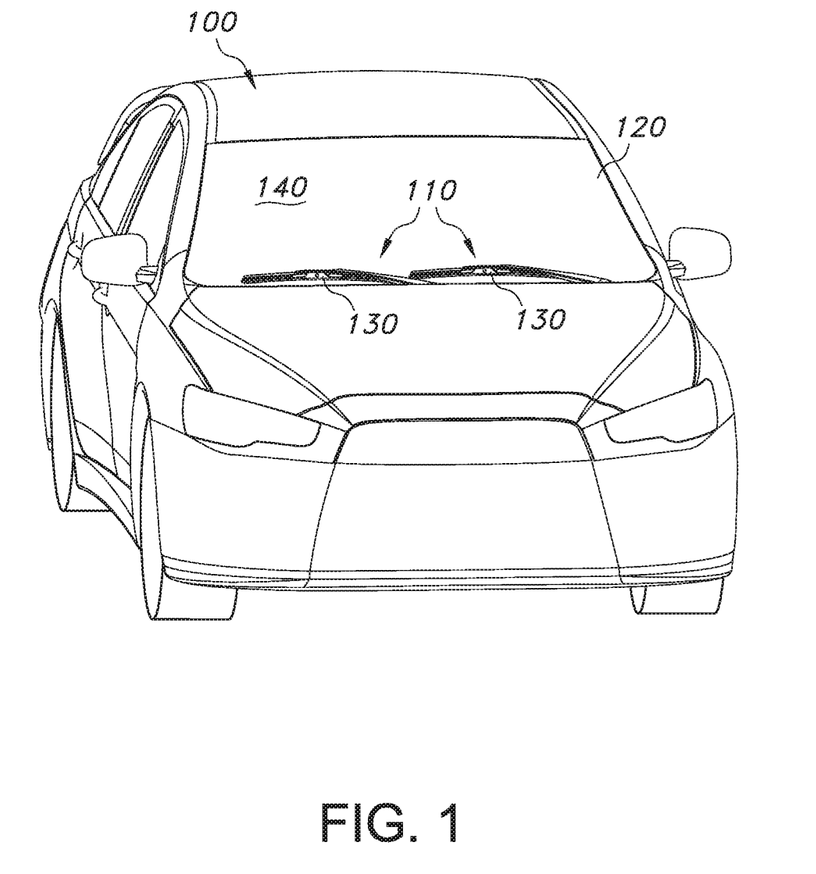
FIG. 1 is a front perspective view of a motor vehicle including a windshield with wipers.

Reference is now made to FIG. 1, which illustrate a vehicle 100 including one or more wipers 110 for wiping a windshield 120. The wipers include wiper blades 130 as is known. The wiper(s) 110 may be caused to move to and from to sweep the windshield 120 as a result of selective actuation by a wiper motor (not shown), which may be controlled using a control (not shown) in the vehicle passenger cabin 140. As is customary, the control may include a high setting, a regular setting, and an intermittent setting that causes the wiper(s) 110 to operate based on a user-selected period, which may be desirable when the rain is light or intermittent. As summarized above, over time and with use the wiper blades 130 may deteriorate or wear sufficiently to require replacement before it becomes visually obvious that replacement is needed To solve this and other problems, with reference to FIG. 2 a system 200 is provided for determining a need for windshield wiper blade 130 replacement. In the illustrated embodiment, the system 200 includes a detector for detecting sound energy, such as a microphone 210. The microphone 210 may be located in the vehicle cabin 140 near the windshield 120 in a manner that simulates the capturing of the sound energy by the ear(s) of the vehicle operator, or may be alternatively placed.

Figure 2:
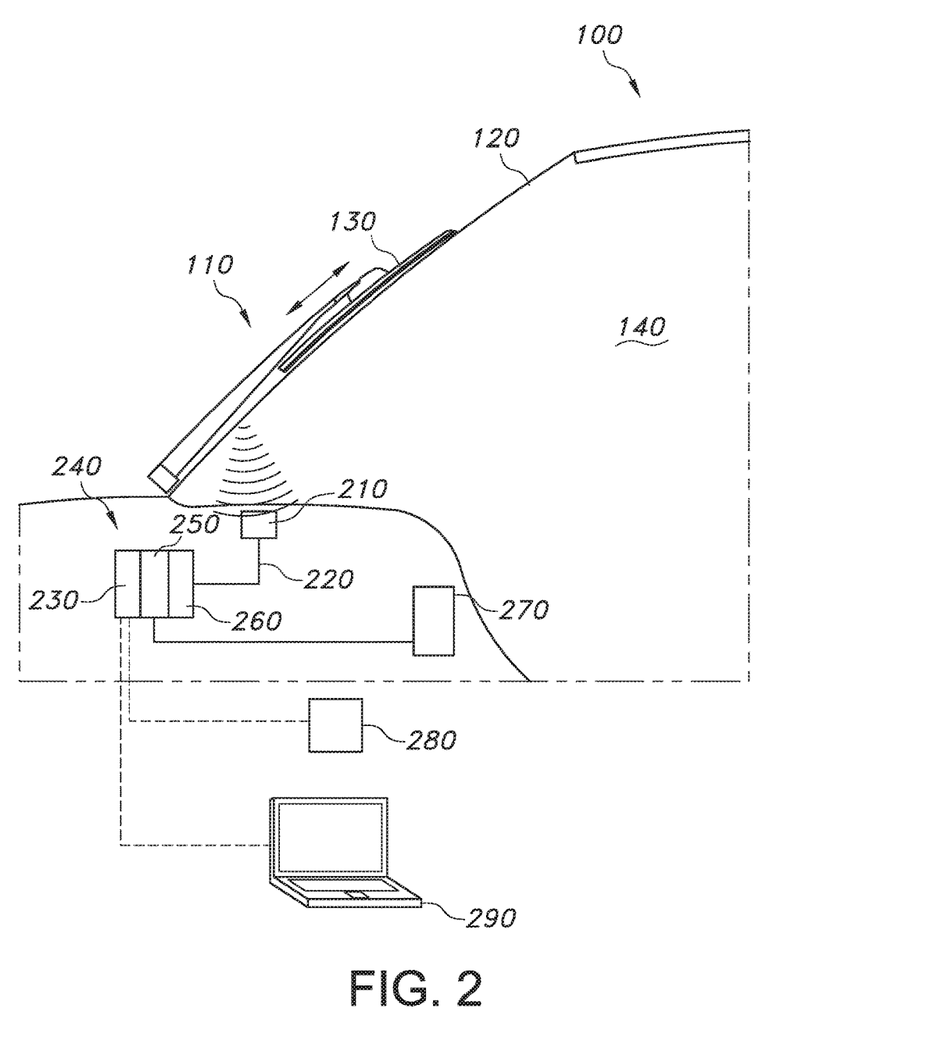
FIG. 2 is a schematic diagram illustrating one embodiment of a system for determining a need for windshield wiper blade replacement.

Upon receiving the sound energy from the noise, the microphone 210 generates a signal 220 representative of the noise resulting from windshield wiper(s) 110 during operation. This signal 220 is received by a processor 230 and used to determine a wear condition requiring wiper blade replacement as will be described below. The processor 230 may be associated with a vehicle controller 240 which may be a computing device or controller associated with a vehicle to control various electrical systems and subsystems, for example as the Body Control Module (BCM). Alternatively, the controller 240 may be a separate computing device or controller dedicated only to monitoring/controlling the presently described system.

The nature and design of computing devices/controllers such as are used to control and monitor various vehicle 100 system functions are well-known in the art. At a high level, such controllers 240 comprise processors or microprocessors 230, storage 250, and memory 260. The controllers 240 may communicate with the systems they control or with other vehicle controllers via a serial bus (e.g., Controller Area Network (CAN)) or via dedicated electrical conduits. The controller 240 may generally include any number of processors/microprocessors 230, ASICs, ICs, memory 260 which may be, e.g., FLASH, ROM, RAM, EPROM and/or EEPROM, and software code comprising computer executable instructions to co-act with one another to perform a series of operations. The controller 240 may communicate with other vehicle systems and computing devices over one or more wired or wireless vehicle connections using common bus protocols (e.g., CAN and LIN). Used herein, a reference to "a controller" or "a computing device" refers to one or more controllers or computing devices.

The processor 230 further communicates by wired or wireless means with one or more local or remote user interfaces to provide a display which may include a windshield wiper blade wear condition warning, a listing of one or more suggested replacement wiper blades, and a listing of one or more suggestions of retail locations for acquiring the replacement wiper blades. The user interface will typically include a display screen for showing such information. In embodiments, the processor 230 may communicate with a dedicated on-board display such as a vehicle entertainment center 270 associated with the vehicle dash panel or a console, with a mobile device such as a user cell phone or smartphone 280, or with a mobile or desktop computing device 290 such as a user laptop computer. As will be appreciated, the processor 230 may communicate with any suitable device providing a user interface, for example a pager, an MP3 player, and others (not shown).

As will be appreciated, a vehicle 100 generates significant noise, i.e. audio signals in addition to those generated by the wipers 110 during operation. Accordingly, to provide an accurate estimate of wiper blade 130 wear, audio signals detected by the microphone 210 are processed and filtered.

Figure 3:
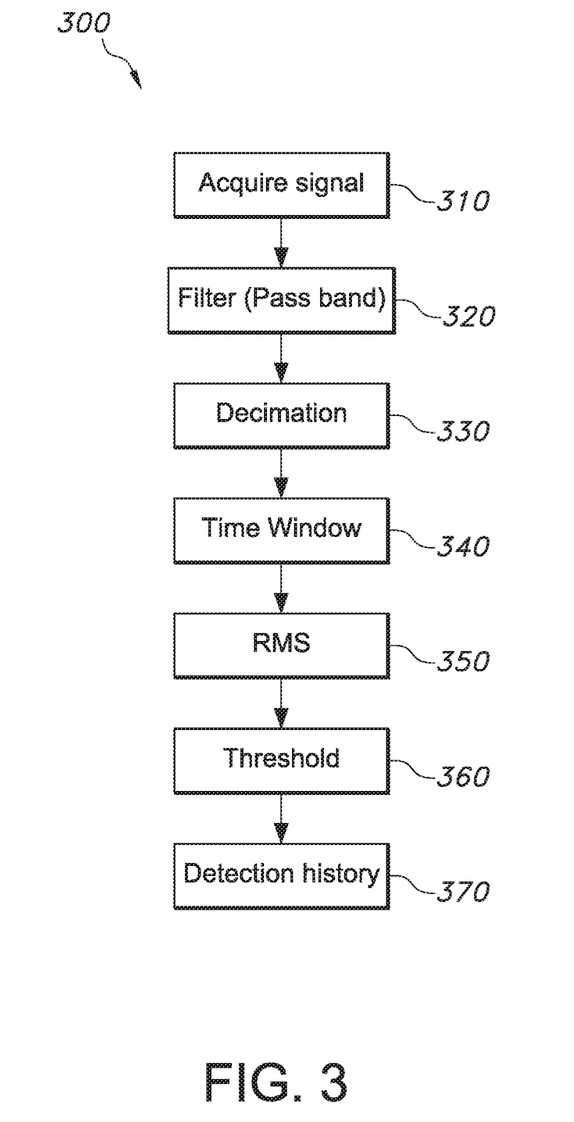
FIG. 3 is a flow chart illustrating a possible implementation of an automated process for determining a need for windshield wiper blade replacement.

In one embodiment, with reference to FIG. 3 there is illustrated a method 300 for filtering an audio signal in order to provide an audio signal determinative of a wear condition requiring wiper blade 130 replacement. At step 310, on activating the vehicle wipers 110 the microphone 210 is likewise activated, and the processor 230 acquires an audio signal from the microphone. As will be appreciated, that audio signal likely comprises noise indicative of wiper blade 130 wear, but also comprises extraneous noise reflective of vehicle 100 operation, ambient (vehicle exterior) noise, road noise, and other audio.

To account for such extraneous noise, the processor 230 operates to filter the audio signal provided by the microphone 210. In other words, the sound waves generated by the wipers 110/wiper blades 130 and captured by the microphone 210 are discretely sampled and analyzed to capture both frequency and location in time information. At step 320, the audio signal is passed through a band pass filter to provide a first filtered audio signal. Next, at step 330 a decimation process is performed in order to reduce the sampling rate of the signal as the acquired noise falls below a specific threshold for each vehicle line. As will be appreciated, this threshold will vary for different vehicle sizes/models because the extraneous noise generated will vary. As one non-limiting example, the set threshold will be approximately 300 Hz for small B-segment vehicles. This decimation process must keep the signal bandwidth above 5 kHz for adequate noise detection. A time window is determined at step 340, being a time period that is less than or equal to ⅕ of a wiper cycle (i.e. the time required for a wiper 110 to make a full traversal through its full range of motion during a cleaning/wiping of a windshield 120). As will be appreciated, this time window is not a set variable, but instead varies according to whether the wipers 110 are being operated on a high setting, a low setting, or an intermittent setting.

This information is used by the processor 230 to calculate a root mean square (RMS) value (sometimes called a quadratic mean) at step 350. In an embodiment, the RMS value calculation is according to the formula $Pa_{rms} = \sqrt{\overline{x^2}}$, wherein x corresponds to a voltage V emitted from the microphone 210, which in turn represents acoustic pressure in Pascals (Pa). This value is then compared to a set threshold value (which represents a known value over which a particular combination of wiper blade 130 and windshield 120 will produce a squeak or other noise) to account for extraneous noise at step 360.

In more detail, the RMS values are computed over short time windows that are less than ⅕ of the wiper 110 time period (for example, 0.1 second signal segments). This enhances wiper noises compared to normal wiper activation, and reduces the effect of extraneous noises that occur over a time period that is shorter than the wiper cycle (avoids false positive detections). On this step the last threshold refers to a known value N10 over which the particular combination of wiper blade 130 and windshield 120 will typically produce a squeak. This threshold is then compared to the audio signal broadcast from the microphone 210 to determine if the wipers are worn out.

In one embodiment, the referenced threshold (step 360) is defined as the N10 value of an audio signal that depends on the segment of the vehicle 100. The threshold 360 is extracted by a percentile RMS analysis of 14 wiper 110 cycles without noise and 1 wiper cycle with noise. Then, the threshold is defined as the RMS value above 90% of the analyzed condition described above. This can be expressed by the formula:

$$\text{RMS}(i) = \sqrt{\frac{\sum_{i}^{i+N} x^2}{N}} \quad \text{Where } N = \frac{1}{5} \text{Wiper}_{time} \cdot \text{Downsampled frequency}$$

wherein x corresponds to a voltage V emitted from the microphone 210, which in turn represents acoustic pressure in Pascals (Pa).

At step 370, if the filtered signal provides a calculated RMS value which represents a noise which potentially indicates a wiper blade 130 wear condition sufficient to require wiper blade replacement, a record is stored in memory 260 as part of a detection history registry. If a number of such noises are stored within a predetermined time period, the processor 230 will generate a display as described above. Each sample noise record consists of M measured activations, discarding the first X cycles as dust, dirt or other elements might induce noises in new wipers.

As will be appreciated, the number of noises, predetermined time period, and discarded first cycles (variables M and X above) used in setting the noise record generation may vary according to vehicle line and/or according to particular configurations of wiper blade 130 and windshield 120. In one non-limiting example of a B-segment vehicle, three such noise records were found sufficient to indicate a worn wiper blade 130 condition, were stored in memory 260, and generated a display.

Figure 4:
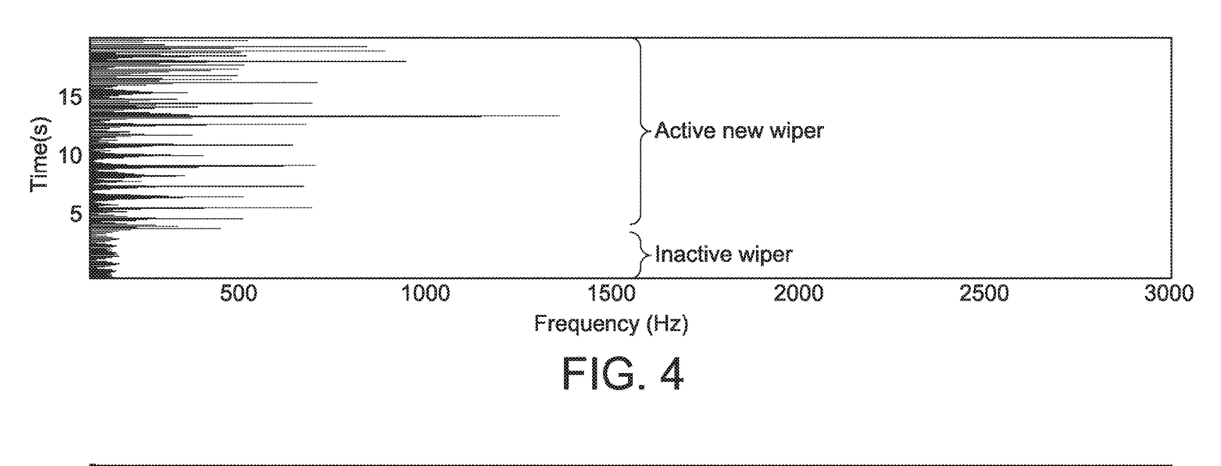
FIG. 4 shows a representative audio profile generated by an activated new wiper blade (top) and by an inactive wiper (bottom)
Figure 5:
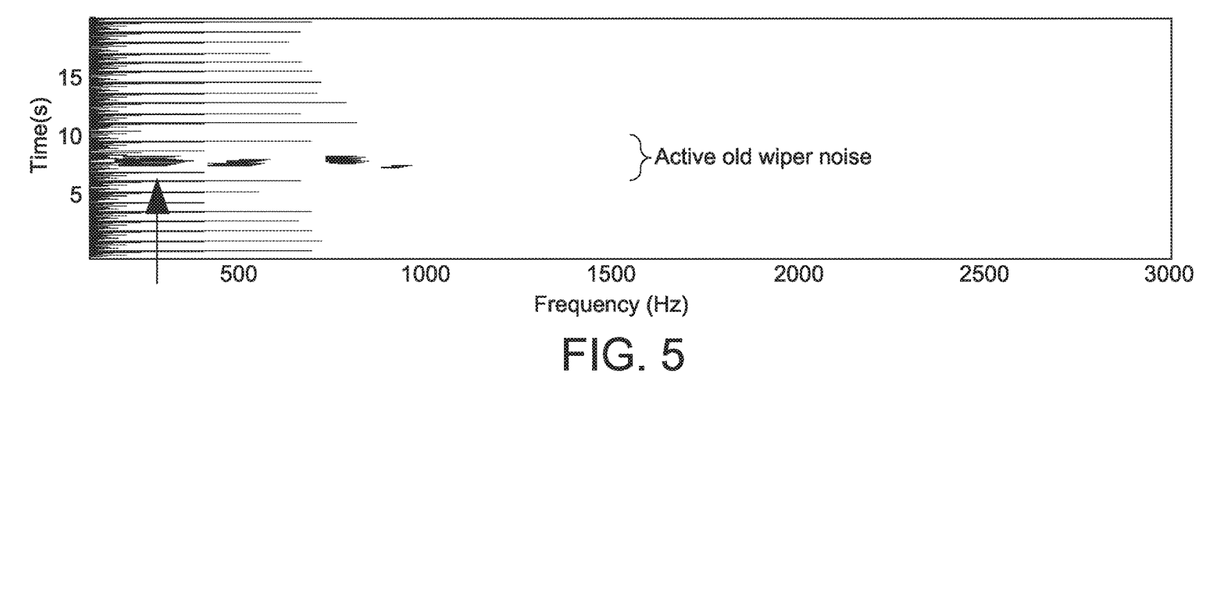
FIG. 5 shows a representative audio profile generated by an activated worn wiper blade.
Figure 6:
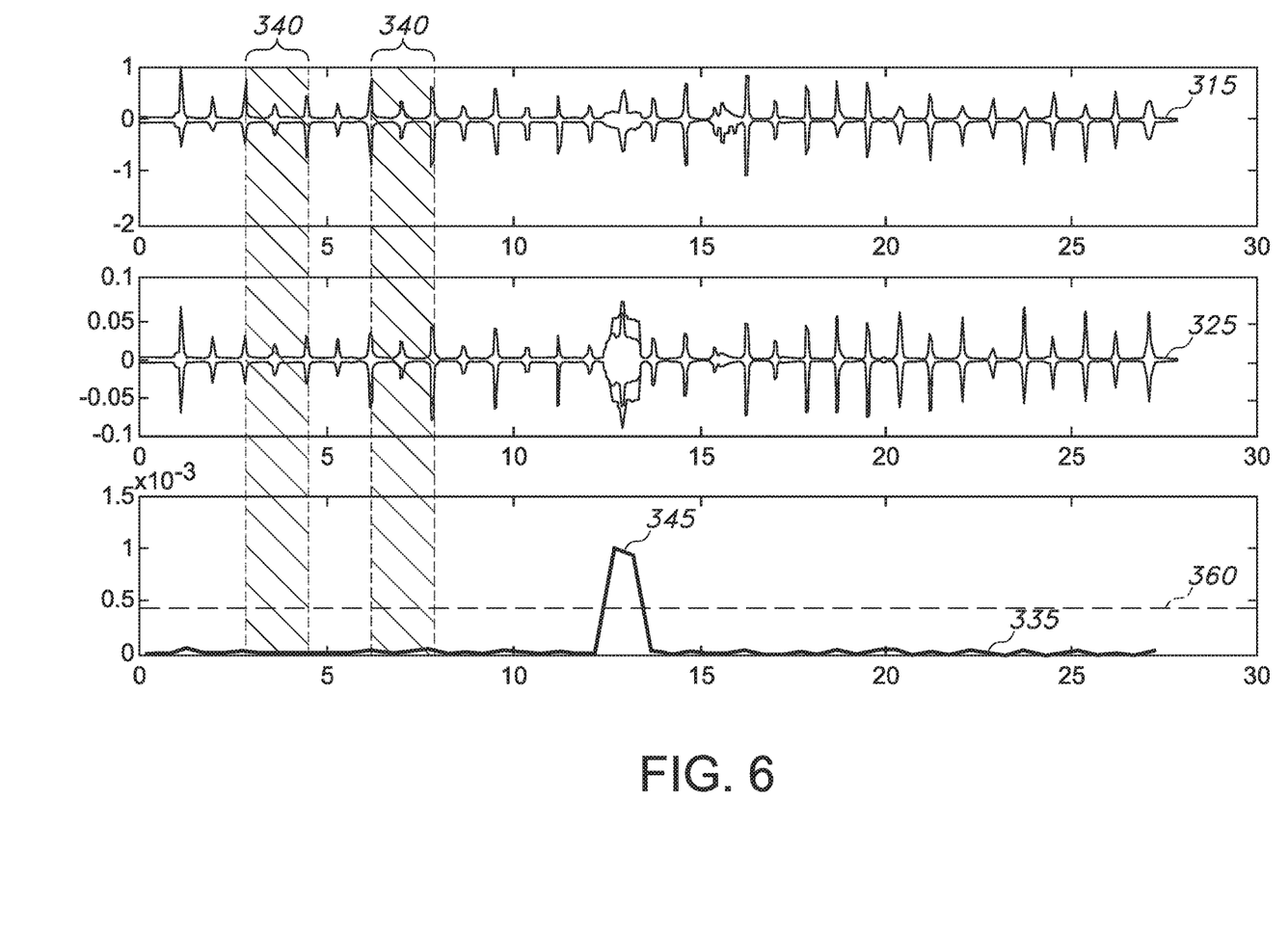
FIG. 6 shows a plot of a filtered audio signal generated by a worn wiper blade.

This is illustrated in FIGS. 4-6. FIG. 4 illustrates a representative audio signal frequency profile for an activated wiper 110 including a new wiper blade 130 (top) and for an inactive wiper (bottom). FIG. 5 shows a similar representative audio signal frequency profile for an older wiper blade 130, wherein as can be seen a noise indicative of a worn wiper blade and having a center frequency of 256 Hz (see arrow) is generated.

FIG. 6 depicts a plot 315 of audio signals (in Hz) for a worn wiper blade 130 against time (s), i.e. the wiper 110 time window 340 as described above. As shown, a plot 325 of the audio signals after filtering as described above in the discussion of FIG. 3 shows a characteristic audio frequency 335 below 300 Hz. The calculated RMS values 345 plotted against the threshold value 360 shows an RMS value 355 (coincident in time with the characteristic audio frequency 335) that exceeds the threshold. The processor 230 therefore interprets this audio signal as a potential wiper blade 130 wear condition, and stores it as described above.

If the detection history 380 provided as summarized above is indicative of a wiper blade 130 wear condition requiring replacement, the processor 230 includes computer executable instructions for providing a display 400 (see FIG. 7) including at least a windshield wiper blade wear condition warning 410 and a listing 420 of one or more suggested replacement wiper blades which may be retrieved from a look-up table stored in memory 260. Optionally, the processor 230 may also generate a second listing 430 of one or more suggestions of locations for acquiring the replacement wiper blades. In one embodiment, a vehicle processing module such as the human-machine interface (HMI) module or other suitable module or processor would receive a periodic update having an updated listing of parts suitable for the particular vehicle, i.e. wiper blades 130 that are original equipment manufacture or compatible therewith.

Figure 7:
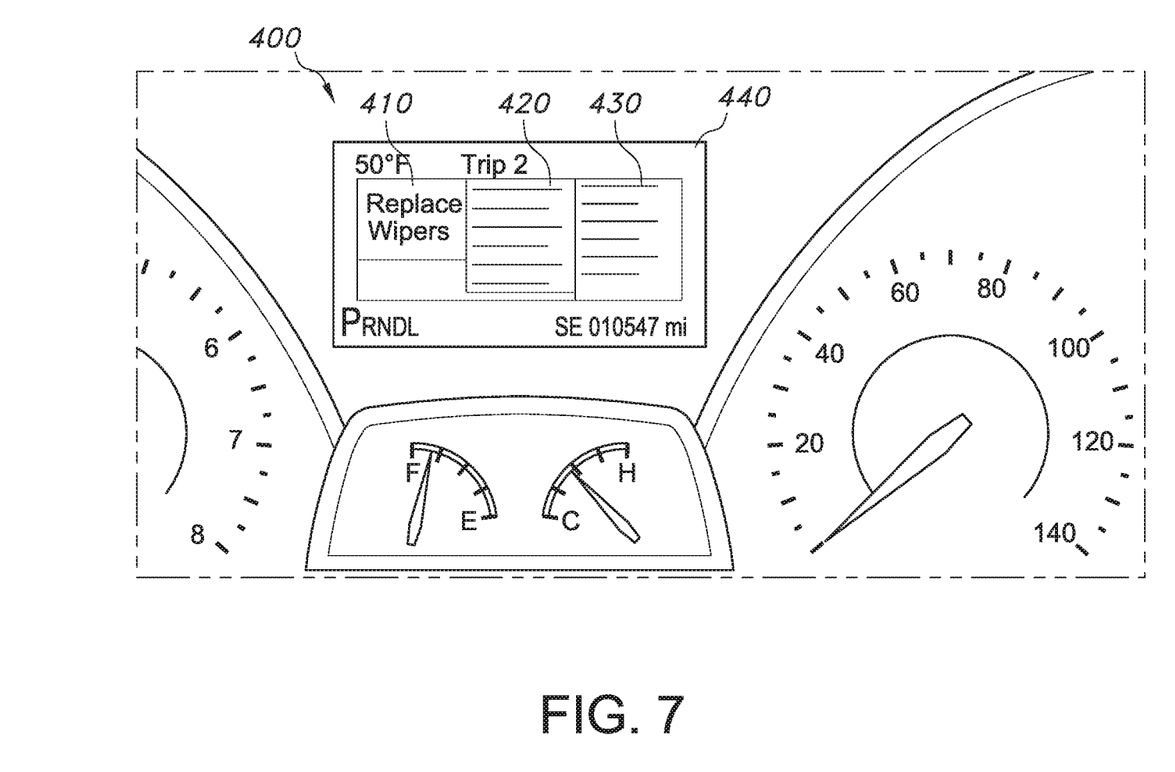
FIG. 7 shows a representative user display provided by the described system.

As noted above, this display 400 may be sent by wired or wireless (i.e., Bluetooth® or other suitable transmitting means) routes to a number of local or remote devices, for example to a dedicated dash panel display screen 440 such as is known for displaying information such as trip length, time, vehicle service requirements, etc. The display 400 could also be sent to a dash panel- or console-mounted vehicle entertainment center (not shown), or to a computing device carried by a user (not shown). By the described system, a timely warning of wiper blade 130 wear requiring replacement is provided to a vehicle user, along with a convenient listing of potential replacements and replacement sources.

The foregoing description has been presented for purposes of illustration. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A system for determining a need for a vehicle windshield wiper blade replacement, comprising:
   a detector for detecting a wiper blade operating noise;
   a processor configured to determine a wear condition requiring wiper blade replacement from the detected wiper blade operating noise; and
   a user interface wherein the processor provides a display comprising at least a windshield wiper blade wear condition warning and a listing of one or more suggested replacement wiper blades.

2. The system of claim 1, wherein the visible display further includes a listing of one or more suggestions of locations for acquiring the replacement wiper blades.

3. The system of claim 1, wherein the processor determines the wear condition requiring wiper blade replacement by filtering an audio signal received from the detector.

4. The system of claim 3, wherein the processor filters the audio signal to distinguish a worn wiper blade audio signal from a new wiper blade audio signal and from a vehicle background audio signal.

5. The system of claim 1, wherein the detector comprises at least one microphone associated with a passenger cabin of the vehicle.

6. The system of claim 1, wherein the processor processes the wiper blade operating noise signal taking into account a rotational speed of the windshield wiper.

7. The system of claim 1, further including a memory for storing a record of the detected wiper blade operating noise indicative of the wear condition requiring wiper blade replacement.

8. The system of claim 7, wherein the processor determines that the wiper blade requires replacement when a predetermined number of records are stored within a predetermined time period.

9. A system for determining a need for a vehicle windshield wiper blade replacement, comprising:
   a detector for detecting a wiper blade operating noise;
   a processor configured to filter a wiper blade audio signal received from the detector;
   a memory for storing a record of a detected wiper blade operating noise indicative of a wear condition requiring wiper blade replacement; and
   a user interface wherein the processor provides a display comprising at least a windshield wiper blade wear condition warning, a listing of one or more suggested replacement wiper blades, and a listing of one or more suggestions of locations for acquiring the replacement wiper blades.

10. The system of claim 9, wherein the processor filters the audio signal to distinguish a worn wiper blade audio signal from a new wiper blade audio signal and from a vehicle background audio signal.

11. The system of claim 9, wherein the detector comprises at least one microphone associated with a passenger cabin of the vehicle.

12. The system of claim 9, wherein the processor determines that the wiper blade requires replacement when a predetermined number of records are stored within a predetermined time period.

13. A method for determining a need for a vehicle windshield wiper blade replacement, comprising:
   by a detector, detecting a wiper blade operating noise and emitting the signal to a processor;
   by the processor, determining a wear condition requiring wiper blade replacement from the emitted signal; and
   by the processor, providing to a user interface a display comprising at least a windshield wiper blade wear condition warning and a listing of one or more suggested replacement wiper blades.

14. The method of claim 13, further including providing to the user interface a listing of one or more suggestions of locations for acquiring the replacement wiper blades.

15. The method of claim 13, including, by the processor, determining the wear condition requiring wiper blade replacement by filtering an audio signal received from the detector.

16. The method of claim 15, including, by the processor, filtering the audio signal to distinguish a worn wiper blade audio signal from a new wiper blade audio signal and from a vehicle background audio signal.

17. The method of claim 13, wherein the detector comprises at least one microphone associated with a passenger cabin of the vehicle.

18. The method of claim 13, including, by the processor, processing the wiper blade operating noise signal taking into account a rotational speed of the windshield wiper.

19. The method of claim 13, further including providing a memory for storing a record of the detected wiper blade operating noise indicative of the wear condition requiring wiper blade replacement.

20. The method of claim 19, including, by the processor, determining that the wiper blade requires replacement when a predetermined number of records are stored in the memory within a predetermined time period.

* * * * *